United States Patent
Reynolds

(10) Patent No.: US 9,518,189 B2
(45) Date of Patent: *Dec. 13, 2016

(54) BINDER SOLUTIONS

(71) Applicant: THE CHEMOURS COMPANY FC LLC, Wilmington, DE (US)

(72) Inventor: Richard Alan Reynolds, Middletown, DE (US)

(73) Assignee: THE CHEMOURS COMPANY FC, LLC, Wilmington, DE (US)

( * ) Notice: Subject to any disclaimer, the term of this patent is extended or adjusted under 35 U.S.C. 154(b) by 31 days.

This patent is subject to a terminal disclaimer.

(21) Appl. No.: 14/370,975

(22) PCT Filed: Jan. 9, 2013

(86) PCT No.: PCT/US2013/020815
§ 371 (c)(1),
(2) Date: Jul. 8, 2014

(87) PCT Pub. No.: WO2013/106421
PCT Pub. Date: Jul. 18, 2013

(65) Prior Publication Data
US 2014/0378584 A1    Dec. 25, 2014

Related U.S. Application Data

(60) Provisional application No. 61/584,350, filed on Jan. 9, 2012.

(51) Int. Cl.
*C08L 81/06*    (2006.01)
*C08G 73/10*   (2006.01)
(Continued)

(52) U.S. Cl.
CPC ............... *C09D 7/001* (2013.01); *C09D 5/002* (2013.01); *C09D 179/08* (2013.01);
(Continued)

(58) Field of Classification Search
CPC .......... C08L 81/06; C08L 79/00; C08G 73/10; C08G 73/1046; C08G 73/14
See application file for complete search history.

(56) References Cited

U.S. PATENT DOCUMENTS 3,956,241 A * 5/1976 Steele .................... C08G 59/70
526/90
4,014,834 A    3/1977 Concannon
(Continued)

FOREIGN PATENT DOCUMENTS

EP    1553134 A2    7/2005
EP    1553134 A3    9/2005
(Continued)

OTHER PUBLICATIONS

Machine translated English language equivalent of JP 2000-302897 (Oct. 2000, 6 pages).*

(Continued)

*Primary Examiner* — Brieann R Fink
(74) *Attorney, Agent, or Firm* — Keith W. Palmer

(57) ABSTRACT

The present invention is directed to alternate solvent systems for polyethersulfone, polyamideimide, polyether imide, polyimide, and/or polyamic acid binder solutions. The present invention provides stable binder solutions equivalent or superior to current binder solvent solutions.

8 Claims, 1 Drawing Sheet

(51) Int. Cl.
  *C08G 73/14* (2006.01)
  *C09D 7/00* (2006.01)
  *C09D 5/00* (2006.01)
  *C09D 179/08* (2006.01)
  *C09D 181/06* (2006.01)
(52) U.S. Cl.
  CPC ........... *C09D 181/06* (2013.01); *C08G 73/10* (2013.01); *C08G 73/1046* (2013.01); *C08G 73/14* (2013.01)

(56) References Cited

U.S. PATENT DOCUMENTS

| | | | | |
|---|---|---|---|---|
| 4,454,276 | A * | 6/1984 | Uda | C08L 79/08 524/209 |
| 4,515,915 | A * | 5/1985 | Uda | C08G 73/1007 524/104 |
| 5,037,862 | A * | 8/1991 | Nishizawa | C08J 3/091 523/223 |
| 5,043,418 | A * | 8/1991 | Olson | C08K 5/544 528/125 |
| 5,470,936 | A * | 11/1995 | Li | C08G 18/34 528/73 |
| 6,207,739 | B1 * | 3/2001 | Ono | C08K 5/0091 524/218 |
| 7,575,789 | B2 | 8/2009 | McKeen | |
| 8,796,411 | B2 * | 8/2014 | Kaneya | C08G 73/1039 528/170 |
| 2003/0004302 | A1 * | 1/2003 | Okamoto | C08G 75/23 528/373 |
| 2004/0081846 | A1 | 4/2004 | Shimizu | |
| 2006/0240255 | A1 | 10/2006 | Kikuchi et al. | |
| 2007/0262426 | A1 | 11/2007 | Mahler | |
| 2010/0167022 | A1 | 7/2010 | Adachi et al. | |
| 2012/0034448 | A1 * | 2/2012 | Liu | B05D 5/083 428/325 |
| 2014/0248781 | A1 * | 9/2014 | Gemmill | C11D 3/0073 438/746 |

FOREIGN PATENT DOCUMENTS

| | | | | |
|---|---|---|---|---|
| EP | | 1717820 | A1 | 11/2006 |
| EP | | 2428539 | A1 | 3/2012 |
| GB | | 2051664 | A | 1/1981 |
| JP | | 2000302897 | A * | 10/2000 |
| JP | WO | 2009107429 | A1 * | 9/2009 ......... C08G 73/1039 |
| SG | WO | 2009008030 | A1 * | 1/2009 ............. C08J 3/212 |
| WO | | 02078862 | A2 | 10/2002 |
| WO | | 02078862 | A3 | 10/2002 |
| WO | WO | 2004055593 | A2 * | 7/2004 ............. G03F 7/094 |
| WO | | 2007070601 | A2 | 6/2007 |
| WO | | 2007070601 | A3 | 6/2007 |
| WO | | 2013106421 | A1 | 7/2013 |

OTHER PUBLICATIONS

International Search Report and Written Opinion, PCT/US2013020815, Mailed Apr. 23, 2013.
Fluorinated Coatings and Finishes Handbook, Chapter 4, pp. 46-58.

* cited by examiner

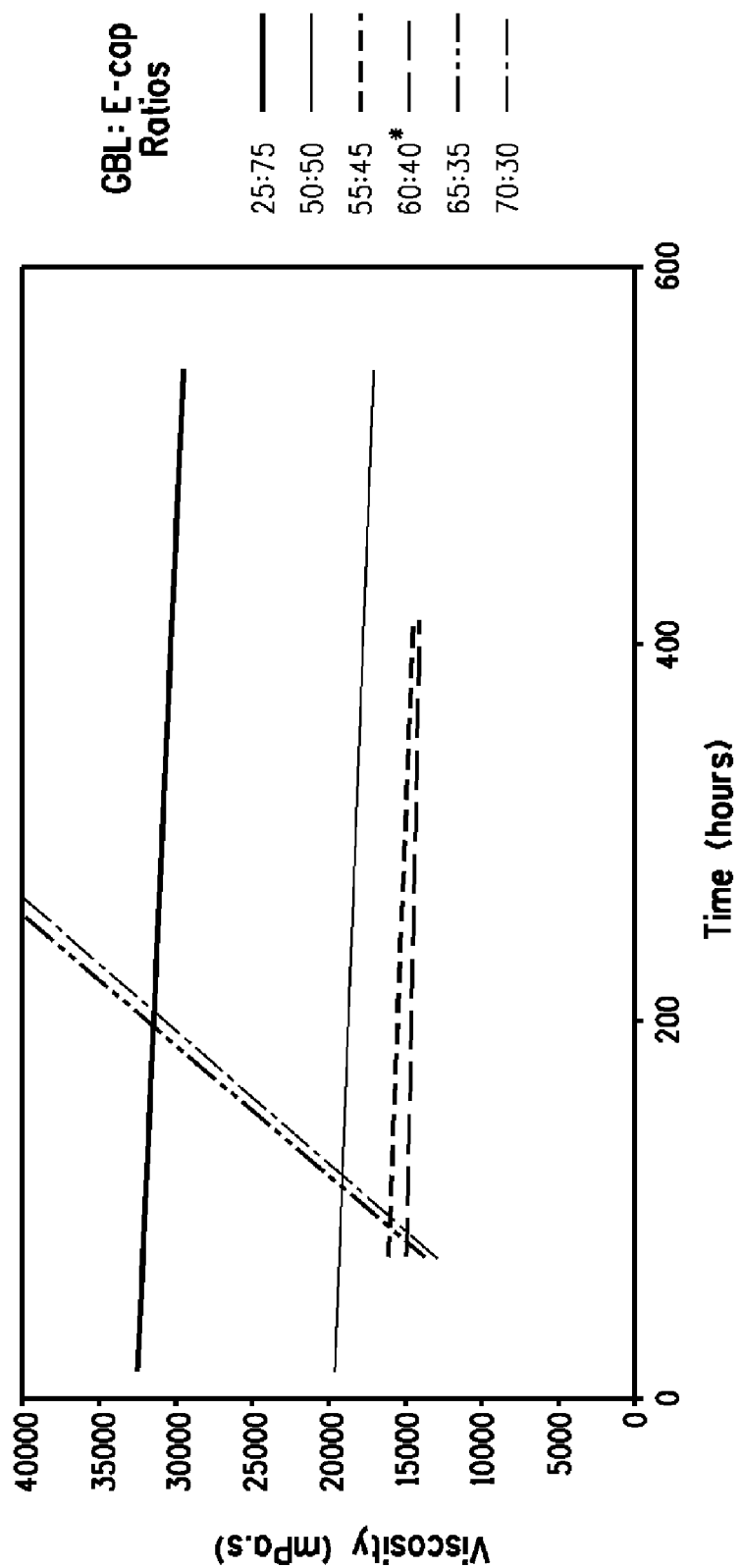

BINDER SOLUTIONS

FIELD OF INVENTION

The field of invention is related to alternate solvent systems for polyethersulfone, polyamideimide, polyether imide, polyimide, and/or polyamic acid binder solutions.

BACKGROUND OF INVENTION

Fluoropolymers have found use in many non-stick and release coating applications such as, for example, non-stick coatings for cookware. However, due to the non-stick nature of perfluoropolymers, primer layers having binders are generally needed to adhere to a surface of a substrate prior to application of the fluoropolymers, to enable sufficient adhesion of the fluoropolymer to the substrate. In the art, binder compositions comprising polyethersulfones (PES) or polyamideimides (PAI) or polyetherimides (PEI) or polyimides (PI), or combinations thereof, have been found to be useful in primer layers as film formers and for adhering to both the substrate surface and with perfluoropolymers.

Current binder compositions utilize N-methylpyrrolidone (NMP) as solvent due to its inexpense and solubilizing capabilities. More recently, the toxicity profile of NMP has been re-evaluated and pending regulations worldwide may minimize or eliminate the use of NMP in such binder solutions. Accordingly, alternative solvents, organic and aqueous based, are needed. Suitable replacement solvents will be capable of solubilizing the binders, including at practical concentrations or binder solids levels, allowing the binders to spread on the substrate surfaces and create a primer layer or film on metal and polymeric surfaces without adversely affecting the binder layer or its ability to bind to both the substrate and the fluoropolymer layers. The present invention meets the need for alternative organic solvents in such binder solutions.

SUMMARY OF THE INVENTION

The present invention is directed to a binder solution for coating systems comprising polyethersulfone, polyamideimide, polyether imide, polyimide, polyamic acid or mixtures thereof, and one or more solvent; wherein the one or more solvent comprises a) acetoacetamides; b) lactones; c) guanidines; d) piperidones; or e) a mixture of two or more compositions selected from acetoacetamides, lactones, guanidines, piperidones, acetoacetates, acetamides, organic carbonates, phthalates, sulfolane, diones, and phosphates.

In an embodiment, the binder solution comprises polyethersulfone, polyamideimide, polyether imide, polyimide, polyamic acid or mixtures thereof, and one or more solvent; wherein the one or more solvent comprises a) acetoacetamides; b) lactones; c) guanidines; d) piperidones; or e) a mixture of two or more compositions selected from acetoacetamides, lactones, guanidines, piperidones, and acetoacetates.

In an embodiment, the solvent comprises diethyl acetoacetamide.

In an embodiment, the solvent comprises epsilon-caprolactone or gamma-valerolactone.

In an embodiment, the solvent comprises tetramethyl guanidine.

In an embodiment, the solvent comprises a mixture of two or more of: delta-valerolactone, delta-decanolactone, gamma hexalactone, delta caprolactone, n-acetylcaprolactam, 1,3-dimethyl-2-imidazolinone, n-vinyl pyrrolidone, gamma-valerolactone, gamma butyrolactone, hydroxylethyl pyrrolidone, epsilon-caprolactone, trimethyl phosphate, triethylphosphate, octyl pyrrolidone, dimethyl phthalate, n-methylcaprolactam, dimethyl piperidone, diethyl acetoacetamide, tetramethyl guanidine, 1-(2-(dimethylamino)ethyl)-5-methylpyrrolidin-2-one, furforal, methyl acetoacetate, dodecyl acetoacetate, isobutyl acetoacetate, isopropyl acetoacetate, ethyl acetoacetate, ethyl levulinate, propylene carbonate, butylene carbonate, dimethyl carbonate, diethyl carbonate, dipropyl carbonates.

In an embodiment, the solvent comprises a mixture of two or more of: delta-valerolactone, gamma-valerolactone, gamma butyrolactone, epsilon-caprolactone dimethyl piperidone, diethyl acetoacetamide, tetramethyl guanidine, methyl acetoacetate, dodecyl acetoacetate, isobutyl acetoacetate, isopropyl acetoacetate, ethyl acetoacetate.

In one such embodiment, the solvent comprises a mixture of gamma butyrolactone and epsilon-caprolactone. Preferably, in such an embodiment, the weight % of gamma butyrolactone is from 50% to less than 65% of the total weight of solvents in the binder solution.

In an embodiment, the binder solution comprises polyethersulfone and one or more solvent wherein the one or more solvent comprises one or more of: a guanidine, a lactone, an acetoacetamide, and a piperidone.

In an embodiment, the binder solution comprises polyethersulfone and diethylacetoacetamide.

In an embodiment, the binder solution comprises polyethersulfone and tetramethyl guanidine.

In an embodiment, the binder solution comprises polyamideimide and one or more solvent wherein the one or more solvent comprises one or more of a lactone, and a piperidone.

In an embodiment, the binder solution comprises polyamideimide and dimethyl piperidone.

In an embodiment, the binder solution comprises polyethersulfone, polyamideimide, polyether imide, polyimide, polyamic acid or mixtures thereof, and one or more solvent; wherein the one or more solvent is selected from a) acetoacetamides; b) lactones; c) guanidines; d) piperidones; or e) a mixture of two or more compositions selected from acetoacetamides, lactones, guanidines, piperidones, acetoacetates, acetamides, organic carbonates, phthalates, sulfolane, diones, and phosphates.

In an embodiment, the binder solution comprises polyethersulfone, polyamideimide, polyether imide, polyimide, polyamic acid or mixtures thereof, and one or more solvent; wherein the one or more solvent is selected from a) acetoacetamides; b) lactones; c) guanidines; d) piperidones; or e) a mixture of two or more compositions selected from acetoacetamides, lactones, guanidines, piperidones, and acetoacetates.

In an embodiment, the solvent is diethyl acetoacetamide.

In an embodiment, the solvent is tetramethyl guanidine.

In an embodiment, the solvent is epsilon-caprolactone or gamma-valerolactone.

In an embodiment, the solvent is selected from a mixture of two or more of: delta-valerolactone, delta-decanolactone, gamma hexalactone, delta caprolactone, n-acetylcaprolactam, 1,3-dimethyl-2-imidazolinone, n-vinyl pyrrolidone, gamma-valerolactone, gamma butyrolactone, hydroxylethyl pyrrolidone, epsilon-caprolactone, trimethyl phosphate, triethylphosphate, octyl pyrrolidone, dimethyl phthalate, n-methylcaprolactam, dimethyl piperidone, diethyl acetoacetamide, tetramethyl guanidine, 1-(2-(dimethylamino)ethyl)-5-methylpyrrolidin-2-one, furfural, methyl acetoacetate, dodecyl acetoacetate, isobutyl acetoacetate, isopropyl acetoacetate, ethyl acetoacetate, ethyl levulinate, propylene carbonate, butylene carbonate, dimethyl carbonate, diethyl carbonate, dipropyl carbonates.

In an embodiment, the solvent is selected from a mixture of two or more of: delta-valerolactone, gamma-valerolactone, gamma butyrolactone, epsilon-caprolactone, dimethyl piperidone, diethyl acetoacetamide, tetramethyl guanidine, methyl acetoacetate, dodecyl acetoacetate, isobutyl acetoacetate, isopropyl acetoacetate, ethyl acetoacetate.

In one such embodiment, the solvent is a mixture of gamma butyrolactone and epsilon-caprolactone. Preferably, in such an embodiment, the weight % of gamma butyrolactone is from 50% to less than 65% of the total weight of solvent in the binder solution.

In an embodiment, the binder solution comprises polyethersulfone and one or more solvent wherein the one or more solvent is selected from one or more of: a guanidine, a lactone, acetoacetamide, and a piperidone. In one such embodiment, the solvent is diethylacetoacetamide. In another such embodiment, the solvent is tetramethyl guanidine.

In an embodiment, the binder solution consists essentially of polyethersulfone and diethylacetoacetamide. In another embodiment, the binder solution consists of polyethersulfone and diethylacetoacetamide.

In an embodiment, the binder solution consists essentially of polyethersulfone and tetramethyl guanidine. In another embodiment, the binder solution consists of polyethersulfone and tetramethyl guanidine.

In an embodiment, the binder solution comprises polyamideimide and one or more solvent wherein the one or more solvent is selected from one or more of: lactone, and a piperidone. In one such embodiment, the solvent is dimethyl piperidone.

In an embodiment, the binder solution consists essentially of polyamideimide and dimethyl piperidone. In an embodiment, the binder solution consists of polyamideimide and dimethyl piperidone. For any of the embodiments presented herein there exists an embodiment wherein the viscosity of the binder solution is less than 50,000 mPa·s, preferably less than 20,000 mPa·s, and even more preferably less than 10,000 mPa·s, at a binder resin solids content of 30% based on the total weight of the binder solution.

For any of the embodiments presented herein there exists an embodiment wherein the binder solution further comprises one or more of: viscosity modifiers, thinning solvents, binders, pigments, fillers, dispersing aids, surface tension modifiers, and perfluoropolymers. In one such embodiment, the thinning solvent is a diether or a glycol ether acetate.

Embodiments of the present invention as described in the Summary of the Invention, and any other embodiments described herein, can be combined in any manner where not mutually exclusive.

DESCRIPTION OF THE FIGURES

FIG. 1 shows a graph of viscosity (mPa·s) plotted against time (hours for varying compositional ratios of gamma butyrolactone and epsilon-caprolactone mixtures present in a 30% by weight solution of polyethersulfone (PES) in the solvent mixture. The FIGURE shows that the viscosity of the PES solution is unstable over time for mixtures containing 65% or greater gamma butyrolactone, with the solution viscosity rising rapidly such that the solution sets up to an unsuitable gel. Increasing the epsilon-caprolactone content in the solvent mixture up to levels of 40% and higher produces a solution viscosity that is stable with respect to time, although the viscosity increases with increasing epsilon-caprolactone content such that levels of 75% epsilon-caprolactone and higher are unsuitable for practical applications. Accordingly, the preferred levels of epsilon-caprolactone in the solvent mixture are greater than 35% and less than 75%; more preferably, the ratio of gamma butyrolactone epsilon-caprolactone (GBL:ECL) in the solvent mixture lies between 65:35 and 25:75, more preferably between 60:40 and 50:50. The preferred ratio of gamma butyrolactone to epsilon-caprolactone (GBL:ECL) in the solvent mixture is approximately 60:40.

DETAILED DESCRIPTION

Herein, a thinning solvent is a solvent that, when added to a composition, effects a reduction in viscosity of that composition.

Herein, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when describing a range.

By "fluoropolymer" it is meant a homopolymer or copolymer with a backbone comprising repeat units of at least one polymerized monomer comprising at least one fluorine atom.

Herein, the term "polyamideimide" (or "PAI") also includes polyamic acid and salts of polyamic acid from which polyamideimide may be derived.

Herein, viscosity values are measured at room temperature (23° C.) using a Brookfield rotating disc viscometer, such as the Brookfield RVDIII Viscometer.

The present invention is directed to a binder solution for coating systems comprising polyethersulfone, polyamideimide, polyether imide, polyimide, polyamic acid or mixtures thereof, and a solvent; wherein the solvent is selected from a) acetoacetamides; b) lactones; c) guanidines; d) piperidones; or e) a mixture of two or more compositions selected from acetoacetamides, lactones, guanidines, piperidones, acetoacetates, organic carbonates, phthalates, sulfolane, diones, and phosphates.

One embodiment of the present invention is a binder solution comprising polyethersulfone and one or more acetoacetamide. Preferably the binder solution comprises polyethersulfone and diethyl acetoacetamide. In some such embodiments, the binder solution additionally comprises a thinning solvent such as a diether or a glycol ether acetate.

A further embodiment of the present invention is a binder solution comprising polyethersulfone and one or more guanidine. Preferably the binder solution comprises polyethersulfone and tetramethyl guanidine. In some such embodiments, the binder solution additionally comprises a thinning solvent such as a diether or a glycol ether acetate.

A further embodiment of the present invention is a binder solution comprising polyethersulfone and one or more acetoacetate.

A further embodiment of the present invention is a solution comprising polyethersulfone and a mixture of two or more compositions selected from the group consisting of acetoacetamides, acetoacetates, lactones, guanidines, piperidones, organic carbonates, phthalates, sulfolane, diones, isophorone, and phosphates. A further embodiment of the present invention is a solution comprising polyethersulfone and a mixture of two or more compositions selected from the group consisting of acetoacetamides, acetoacetates, lactones, guanidines, and piperidones.

A further embodiment of the present invention is a binder solution for coating systems comprising polyamideimide and one or more acetoacetamide. Preferably the binder solution comprises polyamideimide and diethyl acetoacetamide. In some such embodiments, the binder solution additionally comprises a thinning solvent such as a diether or a glycol ether acetate.

A further embodiment of the present invention is a binder solution comprising polyamideimide and one or more guanidine. Preferably the binder solution comprises polyamideimide and tetramethyl guanidine. In some such embodiments, the binder solution additionally comprises a thinning solvent such as a diether or a glycol ether acetate.

A further embodiment of the present invention is a binder solution for coating systems comprising polyamideimide and one or more acetoacetate.

A further embodiment of the present invention is a binder solution for coating systems comprising polyamideimide and a mixture of two or more compositions selected from the group consisting of acetoacetamides, acetoacetates, lactones, guanidines, piperidones, organic carbonates, phthalates, sulfolane, diones, isophorone, and phosphates.

A further embodiment of the present invention is a solution comprising polyamideimide and a mixture of two or more compositions selected from the group consisting of acetoacetamides, acetoacetates, lactones, guanidines, and piperidones.

A further embodiment of the present invention is directed to a binder solution for coating systems comprising a mixture of polyethersulfone, polyamideimide and acetoacetamides. Preferably, the acetoacetamide is diethyl acetoacetamide.

A further embodiment of the present invention is directed to a binder solution for coating systems comprising a mixture of polyethersulfone, polyamideimide and guanidines. Preferably, the guanidine is tetramethyl guanidine.

A further embodiment of the present invention is directed to a binder solution for coating systems comprising a mixture of polyethersulfone, polyamideimide and acetoacetates.

A further embodiment of the present invention is directed to a binder solution for coating systems comprising a mixture of polyethersulfone, polyamideimide and a mixture of two or more compositions selected from the group consisting of acetoacetamides, acetoacetates, lactones, guanidines, piperidones, organic carbonates, phthalates, sulfolane, diones, isophorone, and phosphates.

A further embodiment of the present invention is directed to a binder solution for coating systems comprising a mixture of polyethersulfone, polyamideimide and a mixture of two or more compositions selected from the group consisting of acetoacetamides, acetoacetates, lactones, guanidines, and piperidones.

An alternate embodiment of the present invention is directed to a binder solution for coating systems comprising a single binder with a single solvent. One example of such embodiment is wherein the binder is polyethersulfone and the solvent is a guanidine, a lactone, an acetoacetamide, or a piperidone. Another example is where the binder solution comprises polyamideimide and the solvent is a lactone, or a piperidone.

It is well known that due to the non-stick nature of fluoropolymers, primer layers containing binders are needed to enable the fluoropolymer to coat the substrate. Examples of fluoropolymers include, but are not limited to, fluoropolymer such as polytetrafluoroethylene (PTFE), fluorinated ethylene propylene (FEP), perfluoroalkoxy (PFA), ethylene tetrafluoroethylene (ETFE). Binders, such as polyethersulfones and polyamideimides, are well known in primer applications for non-stick finishes and can be present at solids levels as high as 70% by weight. In current practice, these binders are solubilized in NMP. Polyethersulfone is an amorphous polymer having a sustained use temperature of up to 190° C. and a glass transition temperature of 220° C. Polyamideimide is thermally stable at temperatures of at least 252° C. and melts at temperatures of at least 290° C. Primer layers comprise one or more binders. Primer layers may further comprise a fluoropolymer such as polytetrafluoroethylene (PTFE), fluorinated ethylene propylene (FEP), perfluoroalkoxy (PFA), ethylene tetrafluoroethylene copolymer (ETFE), tetrafluoroethylene-perfluorinated alkyl vinyl ether copolymer, polyvinyl fluoride, polyvinylidene fluoride, polyhexafluoropropylene, ethylene-hexafluoropropylene copolymer, ethylene-vinyl fluoride copolymer, or any combination thereof, for example, which may help enhance adhesion of the fluoropolymer to the primer layer.

To apply the binders to the surface of a substrate, it is convenient for the binder to be adequately solubilized in a solvent or aqueous solution, prior to application. Most applications of binders involve spraying the binder solution onto a surface prior to heating and/or curing. Alternately, the binder solutions can be brushed, rolled, dipped, misted, or applied via any other known application known to those skilled in the art.

Practically speaking, it is desirable to utilize binder solutions wherein the binder is present at a level of at least 5 weight % in the solvent or solvent mixture. However, the binders of choice (PAI, PES, PEI, PI) are sparingly soluble in most organic solvents. Moreover, it is further desirable that the binder solutions be available on their own, ready to be supplied and later formulated in primer compositions. For this reason, it is particularly desirable to be able to prepare such "intermediates" at a solids level of at least 30 weight %, and preferably 50 weight %, in the solvent or solvent mixture in order that the binder solution may be transported and applied economically, for example, to minimize the quantity of solvent transported and the quantity of solvent recycled or remediated upon use. For ease of formulation, the binder intermediates should exist as flowable solutions. That is, the viscosity of the intermediate is preferably stable over time and below 20,000 mPa·s (at 23° C., using a Brookfield rotating disc viscometer, such as the Brookfield RVDIII Viscometer).

Suitable substrates where the present invention may be applied include, but are not limited to, pipes, pots, pans, and rubber rollers.

The above embodiments may further comprise viscosity modifiers, thinners, pigments, fillers high boiling liquids, dispersing aids, surface tension modifiers, fluoropolymers and other formulation additives.

The solvents suitable in the present invention are organic liquids and can be further described by their Hansen solubility parameters. Hansen solubility parameters are discussed in detail in Kirk-Othmer, Encyclopedia of Chemical Technology, second edition, 1963, pp 889-896. Hansen solubility parameters are based on contributions to enemy terms from dispersion forces between molecules ($\delta d$), energy from dipolar intermolecular forces between molecules (δp), and energy from hydrogen bonds between molecules (δh).

The range of Hansen parameters of candidate solvents for polyethersulfone and polyamideimide are listed in Table 1. Examples of candidate solvents are listed below (see Table 2). As a first requirement, suitable solvents useful in the present invention will create stable solutions of the binders (at resin binder solids of at least 5 weight %, and preferably at least 30 weight %, in the solvent or solvent mixture) and are capable of depositing a uniform film of the polyethersulfone and/or polyamideimide on a surface of a substrate. Preferably, the binder solution viscosity should be less than 50,000 mPa·s, more preferably less than 20,000 mPa·s, and even more preferably less than 10,000 mPa·s.

TABLE 1

Hansen parameters of candidate solvents for polyethersulfone and polyamideimide, in cal$^{1/2}$cm$^{-3/2}$ (MPa$^{1/2}$).

|  | δd | δp | δh |
|---|---|---|---|
| Min | 7.2 (14.7) | 2.2 (4.5) | 2.1 (4.3) |
| Max | 9.9 (20.3) | 9.0 (18.4) | 7.7 (15.7) |

For polyethersulfone and/or polyamideimide binder solutions, preferably the solvent is present from 30 to 75% of the total composition. In one embodiment, solvent systems comprise a binary solvent system of two solvents. The binary solvent system may be present at 50:50 ratio, but may also vary in ratio from 10:90 ratio to 90:10 ratio.

In certain embodiments, viscosity modifier and/or thinning solvents are beneficial to enhance the spreadability of the solution on the surface of the substrate. Suitable viscosity modifiers and thinning solvents are any liquid that reduce the viscosity of the solvent without adversely reacting with or affecting the binder. Examples of viscosity modifiers include, but are not limited to, 1-butanol, 2-propanoltriethylene propyl propionate, propylene glycol methyl ether, propylene glycol propyl ether, ethyl acetate, and mixtures thereof.

In any of the above embodiments, binder solutions can be made with various solvents as defined above to enable application of the binder solution to a surface of a substrate, and also allow easy removal of the solvent to form a primer layer. Suitable solvents also will be able to solubilize or stabilize additional components such as viscosity modifiers, thinning solvents, pigments, fillers, dispersing aids, surface tension modifiers, and fluoropolymers that, when present, enhance primer performance. Thinning solvents may include, for example, 1-butanol, 2-propanol, propylene glycol methyl ether, propylene glycol propyl ether, and ethyl acetate.

The binder solutions of the current invention are useful in coatings, particularly in primers for non-stick fluoropolymer coatings, such as primers for non-stick cookware. The binder solutions also find use in other coating applications, such as, for example, base coats in the interior of metered dose inhalers (as used, for example, on interior surfaces of inhalers for asthma medication).

Examples

Resin Solutions

The procedure for preparing a solvent-based polyamideimide-based primer or one-coat system is as follows:

All required solvents were added into a mixing vessel with a paddle stirrer. Polyamideimide or polyethersulfone resin powder was added and stirred until fully dissolved and uniform to ensure solubility. If desired, enough pigment dispersion was added to create any color desired, and stirred. Similarly, if required, an amount of fluoropolymer powder or pre-milled fluoropolymer was added, and stirred, followed by addition of any additives for abrasion resistance, improved wetting or adhesion, appearance, or other performance qualities, and the composition stirred for 6 hours (until uniform).

Similar procedures may be used to prepare other solvent-based resin-based coating compositions.

In determining whether a given solvent may be suitable for the resin, from the practical standpoint of use in a coatings formulation, it was considered that the resin should be soluble to at least an extent of 10% in a given solvent. Desirably, the resin should be soluble to an extent of 30% in a given solvent. Examples 1 to 24 were prepared by contacting the solvent, as indicated in Table 2, with a 10 g quantity of polyamideimide (Torlon™ A1-10, available from Solvay S A, Brussels, Belgium) or polyethersulfone (Ultrason™ E-2020, available from BASF, Ludwigshafen, Germany) at room temperature (23° C.); the solvent was added in sufficient quantity to bring the total weight of resin and solvent to 100 g. For the solubility determinations shown in Table 2, no other formulation components were included (no pigment or fluoropolymer or formulation additives). The mixture was stirred for 6 hours at room temperature before decanting off the supernatant liquid and drying at 200° C. for 30 minutes. The weight of dried solid was subtracted from the original 10 g sample to determine the approximate amount of resin soluble in a 100 g solution. For the case in which no dried solids are left, it was considered that the resin is soluble to an extent of at least 10 g of resin per 100 g of resin solution, which was designated a score of 10. As an example, if 4.0 g of dried resin solids were left, it was considered that 6.0 g of resin was solubilized by the solvent, which was designated a score of 6 (meaning approximately 6 weight % resin in the solvent solution). For each solvent, the test was performed, separately, for PAI and PES and the score (0-10) recorded. The score corresponds to the approximate weight % resin soluble in the solvent, except that a score of 10 indicates a solubility of at least 10 wt % resin in the solvent would be possible.

TABLE 2

PAI and PES resin content in 100 g resin/solvent solution composition and Hansen parameters

| Ex. | PAI % | PES % | Solvent | δd | δp | δh |
|---|---|---|---|---|---|---|
| 1 | 10 | 10 | 2-pyrrolidinone | 9.5 | 8.5 | 5.5 |
| 2 | 10 | 10 | DMAC (dimethylacetamide) | 8.2 | 5.6 | 5.0 |
| 3 | 10 | 10 | DMF (dimethylformamide) | 8.5 | 6.7 | 5.5 |
| 4 | 10 | 10 | NEP (N-ethyl pyrrolidone) | 8.8 | 5.9 | 3.4 |
| 5 | 4.5 | 10 | vinyl caprolactam | 8.8 | 5.8 | 3.0 |
| 6 | 10 | 4 | 5-methyl-2-hydroxyethyl pyrrolidone | 9.1 | 4.5 | 6.7 |
| 7 | 5 | 5 | 5-methyl-2-pyrrolidinone | 9.6 | 7.4 | 3.9 |
| 8 | 10 | 10 | 1,5 dimethyl pyrrolidone | 8.1 | 4.4 | 3.0 |
| 9 | 10 | 6 | dimethyl propylene urea | 9.1 | 7.8 | 4.0 |
| 10 | 10 | 10 | tetramethylurea | 8.2 | 4.0 | 5.4 |
| 11 | 0 | 0 | sulfolane | 9.9 | 8.9 | 5.3 |
| 12 | 10 | 10 | Xolvone (dimethyl piperidone) | 8.3 | 5.2 | 3.6 |
| 14 | 10 | 10 | NVP (N-vinyl pyrrolidone) | 8.0 | 4.5 | 2.9 |
| 15 | 4.5 | 10 | gamma-valerolactone | 9.6 | 9.0 | 3.3 |
| 16 | 10 | 4 | gamma butyrolactone | 9.3 | 8.1 | 3.6 |

TABLE 2-continued

PAI and PES resin content in 100 g resin/solvent solution composition and Hansen parameters

| Ex. | PAI % | PES % | Solvent | ∂d | ∂p | ∂h |
|---|---|---|---|---|---|---|
| 17 | 10 | 4 | HEP (hydroxy-ethyl pyrrolidone) | 8.8 | 4.5 | 7.7 |
| 18 | 1.5 | 10 | epsilon-caprolactone | 9.6 | 7.3 | 3.6 |
| 19 | 1.5 | 2 | LP100 (octyl pyrrolidone) | 8.5 | 2.7 | 2.3 |
| 20 | 0 | 2.5 | dimethyl phthalate | 9.1 | 5.3 | 2.4 |
| 21 | 10 | 10 | N-methylcaprolactam | 8.5 | 2.2 | 2.1 |
| 22 | 2 | 9 | diethyl acetoacetamide | 8.2 | 4.0 | 2.9 |
| 23 | 1 | 10 | tetramethyl guanidine | N/A | N/A | N/A |
| 24 | 0 | 10 | furfural | 9.1 | 7.3 | 2.5 |
| A | 10 | 10 | NMP | 8.8 | 6.0 | 3.5 |

Although, in some cases, promising from the viewpoint of solubility characteristics, the following solvents were ruled out of consideration for use in commercial systems due to an unfavorable toxicity profile: 2-pyrrolidinone, DMAC (dimethylacetamide), DMF (dimethylformamide), NEP (N-ethyl pyrrolidone), vinyl caprolactam, 5-methyl-2-hydroxyethyl pyrrolidone, 5-methyl-2-pyrrolidinone, 1,5 dimethyl pyrrolidone, tetramethylurea, NVP (N-vinyl pyrrolidone), N-methylcaprolactam, and furfural. Additionally, sulfolane, LP-100 (octyl pyrrolidone), and dimethyl phthalate were ruled out due to their inability to solubilize PAI or PES to any significant extent.

The remaining candidates were tested in coatings applications. The primary purpose of these binders in fluoropolymer coatings is as a primer layer to provide adhesion of the coating to the substrate (which, in turn, requires adhesion of the primer to the substrate and adhesion of the primer to the fluoropolymer coating layer applied on top of the primer). The remaining candidate binder solutions were evaluated in an industry test for adhesion to the substrate, the Cross Hatch Tape Adhesion test (CHTA test).

Test Procedure—Cross Hatch Tape Adhesion Test (ASTM D3359)

The test procedure follows that of ASTM D3359-92a. For the purpose of completing a basic screening of solvents for replacement of NMP, an unfilled (unformulated) film of the binder was used with no topcoat at a dry film thickness of 0.5 mils. The binder solutions were used as derived from the solubility determinations above, meaning that the resin binder solids content in the binder solution was 10 weight percent unless the candidate solvent was unable to solubilize the resin to that extent. In the latter case, the binder solutions were drawn down at the solids content present in the binder solution (as shown in Table 1). The film was applied by spraying onto smooth aluminum fry pans, and dried at 150° F. (65.5° C.) for 10 minutes and then at 650° F. (343° C.; measured metal temp) for 20 minutes. The resultant dry film was scored with a blade through the coating to the bare metal with a grid template having 1 mm spacings. Eleven parallel cuts were made with the cross hatch template, which procedure was then repeated at a right angle to the first series of cuts, in order to produce a grid of 100 squares in the coating. Adhesive tape (Scotch™ Tape, 3M, St. Paul, Minn., USA) is pressed down evenly on each coating surface over the scored area, and then pulled up evenly at a 90 degree angle. Adhesion to the substrate was evaluated according to the amount of the film that was removed or lifted by the tape as follows:

Rating "A"—all incisions are smooth, and there is no loss of adhesion in the squares, in the corners, or at the points of intersection of the cuts.

Rating "B"—slight peeling is found at the point of intersection of the cuts.

Rating "C"—there is substantial loss of adhesion along the points of intersection of the cuts and adhesion loss in the squares.

Rating "D"—complete loss of adhesion.

All of the tested resin solutions produced smooth coatings.

TABLE 3

Effect of Formulation Solvent on Film Properties (Adhesion) Solvent Screening

| Solvent Name | CAS # | PAI Sol | CHTA | PES Sol | CHTA |
|---|---|---|---|---|---|
| NMP | 872-50-4 | 10 | A | 10 | A |
| Dimethyl Piperidone (DMP) | 1690-76-2 | 10 | A | 10 | A |
| Dimethylpropylene Urea (DMPU) | 7226-23-5 | 10 | B | 6 | B |
| Hydroxyethyl Pyrrolidone (HEP) | 3445-11-2 | 10 | B | 4 | B |
| Diethyl Acetoacetamide (DEAA) | 2235-46-3 | 2 | N/T | 9 | A |
| Tetramethylguanidine (TMG) | 80-70-6 | 1 | N/T | 10 | A |
| Gamma Butyrolactone (GBL) | 96-48-0 | 10 | B | 4 | B |
| Epsilon Caprolactone (ECAP) | 502-44-3 | 2 | N/T | 10 | A |
| Gamma Valerolactone (GVL) | 108-29-2 | 5 | B | 10 | A |
| 50:50 GBL:ECAP | N/A | 5 | B | 10 | A |
| 50:50 ECAP:DEAA | N/A | 10 | A | 10 | A |
| 50:50 GVL:ECAP | N/A | 10 | A | 10 | A |
| 50:50 GBL:GVL | N/A | 8 | B | 10 | A |

(N/T means not tested; the solubility was considered to be insufficient to provide an acceptable coating).

A requirement of any replacement hinder solution is that it must have equal or better performance in adhesion tests compared to the current binder solutions that utilize NMP. A CHTA rating of "B" is considered unacceptable. The following candidate replacement solvents failed to produce a binder solution that results in sufficient adhesion to the substrate: dimethylpropylene urea DMPU), hydroxyethyl pyrrolidone (HEP) and gamma butyrolactone (GBL). However, GBL did show utility in blends of two or more solvents to provide binder solutions for PES. The preferred solvent system for use in binder solutions of polyamideimide is dimethyl piperidone (DMP), or blends comprising two or more lactones, or blends of lactones with diethyl acetoacetamide (DEAA). The preferred solvent system for use in binder solutions of polyethersulfone is dimethyl piperidone (DMP), or diethyl acetoacetamide (DEAA), or epsilon caprolactone (ECAP), or gamma valerolactone (GVL), or blends comprising two or more lactones or blends of lactones with diethyl acetoacetamide (DEAA).

In the production of intermediates, which may require a binder resin solids content of more than 20%, more commonly greater than 30%, the use of either epsilon caprolactone or gamma valerolactone in PES binder solutions may require either a cosolvent or a thinning solvent because the viscosity of the binder solution is too high to be easily handled. FIG. 1 shows how some blends (for example, a blend of epsilon caprolactone and gamma butyrolactone) can circumvent this issue.

What is claimed is:

1. A binder solution comprising polyethersulfone, polyamideimide, polyether imide, polyimide, or mixtures thereof, and solvent comprising acetoacetamides.

2. A binder solution of claim 1 further comprising one or more of: viscosity modifiers, thinning solvents, binders, pigments, fillers, dispersing aids, surface tension modifiers, and fluoropolymers.

3. The binder solution of claim 2 wherein the thinning solvent is a diether or a glycol ether acetate.

4. The binder solution of claim 1 wherein the solvent comprises diethyl acetoacetamide.

5. A binder solution of claim 1, wherein the solvent comprises a mixture of diethyl acetoacetamide and at least one solvent selected from the group consisting of: delta-valerolactone, gamma-valerolactone, gamma butyrolactone, epsilon-caprolactone, dimethyl piperidone, tetramethyl guanidine, methyl acetoacetate, dodecyl acetoacetate, isobutyl acetoacetate, isopropyl acetoacetate, and ethyl acetoacetate.

6. The binder solution of claim 1 having a resin binder solids content of at least 30%, as a percentage by weight of the total composition, and a viscosity of no greater than 20,000 mPa·s.

7. The binder solution of claim 1 wherein the binder solution comprises polyethersulfone and solvent comprises acetoacetamide.

8. The binder solution of claim 7 comprising polyethersulfone and diethylacetoacetamide.

* * * * *